United States Patent Office 2,977,346
Patented Mar. 28, 1961

2,977,346

PURIFICATION OF AROMATIC-CONTAINING RESINS

Neville Leverne Cull, Baker, La., assignor to Esso Research and Engineering Company, a corporation of Delaware No Drawing. Filed July 23, 1957, Ser. No. 673,585

8 Claims. (Cl. 260—80.7)

This invention relates to a method for separating unreacted hydrocarbon monomers from a hydrocarbon polymerization reaction product and more particularly relates to such a process in which the polymerization product is soluble in a hydrocarbon solvent.

In many hydrocarbon polymerization processes it is often necessary to prepare polymer products which are free from small contaminating amounts of monomers or solvents. For example, a copolymer of 60% styrene and 40% isobutylene having a molecular weight of about 2000 finds use as a substitute for chicle in the preparation of chewing gum. One of the chief drawbacks to the use of this material as a chicle substitute is the presence of small amounts of unreacted monomeric styrene in the finished polymer. Styrene is toxic to the human system and imparts an undesirable odor to any chewing gum which is made from it.

A representative type of copolymer to which the invention may be applied is one made by copolymerizing styrene and isobutylene at a temperature of about —80° to —90° C. (corresponding to —112° to —130° F.), in the presence of methyl chloride as diluent and solvent, and in the presence of aluminum chloride as catalyst.

U.S. Patent 2,274,749 describes copolymers of the general type referred to above, e.g., copolymers of isobutylene and styrene, and methods of preparing same, such as copolymerization of the reactants at a temperature below about 0° C., in the presence of an active halide polymerization catalyst, and preferably in the presence of an inert volatile organic liquid serving as solvent and refrigerant. The temperature may range from about —10° C. to —103° C. or lower, and the patent indicates that by adjusting the proportions of the two raw materials, copolymers of desired hardness, melting point, plasticity, etc. may be obtained.

Similarly the resins prepared by the Friedel-Crafts polymerization of steam-cracked gas oil or naphtha feeds at temperatures between —100° C. and +100° C. are water white and also suitable as chicle substitutes after hydrogenation. Since the feed to the polymerization often contains aromatic hydrocarbons, the final resin may easily be contaminated with small amounts of these compounds. Thus, removal of the last traces of the aromatic hydrocarbons is obviously desirable.

It will be obvious to those skilled in the art that other polymeric hydrocarbons may contain contaminating amounts of toxic or otherwise undesirable hydrocarbons either as monomers or as solvents and that it would therefore be desirable to remove them.

For example, contaminating amounts of aromatic hydrocarbons can be removed from tripolymers of diolefins, olefins and aromatic hydrocarbons prepared by contacting them with a dissolved Friedel-Crafts-type catalyst such as aluminum chloride, aluminum bromide, titanium tetrachloride, boron trifluoride, uranium chloride or the like dissolved in a low-freezing, inert, non-complex forming solvent such as ethyl or methyl chloride or carbon disulfide or the like at a temperature between 0° and —150° C. as described in U.S. Patent 2,676,933.

Styrene can also be removed from the tripolymer of isobutylene, styrene and a diolefin prepared by contacting the monomers with boron fluoride at temperatures between 0° C. and —150° C. in accordance with the teachings of U.S. Patent 2,609,359.

Likewise, residual amounts of styrene can be removed from the copolymer of ethylene and styrene prepared by contacting the monomers with a Friedel-Crafts catalyst such as aluminum chloride, aluminum bromide, titanium tetrachloride and boron trifluoride in a low-freezing, non-complex forming solvent such as ethyl or methyl chloride at a temperature between —80° and +60° C. in accordance with the teachings of U.S. Patent 2,563,631.

Similarly, residual amounts of styrene can be removed from the copolymer of isoprene and styrene prepared by emulsifying the monomers in water in the presence of an oxygen-providing polymerization catalyst such as potassium persulfate or other catalysts well known in the art at a temperature between 25° and 75° C. in accordance with the teachings of U.S. Patents 2,393,157; 2,526,654; and 2,661,339.

In like manner, residual amounts of divinyl benzene can be removed from divinyl benzene-modified butyl rubber prepared by contacting an isomonoolefin such as isobutylene, a diolefin such as isoprene and from 0.1 to 1.5% of divinyl benzene with a Friedel-Crafts catalyst dissolved in a low-freezing, non-complex forming catalyst such as ethyl or methyl chloride at a temperature between 0° C. and —164° C. in accordance with the teachings of U.S. Patent 2,781,334.

The disclosures of each of the patents mentioned above are included herein by reference in order to complete the disclosure of this specification.

Accordingly, therefore, it is the major object of this invention to provide a method for the removal of undesirable monomers or solvents from polymeric hydrocarbons.

It is a further object of this invention to provide a method for preparing non-toxic and odor-free hydrocarbon polymers.

Other objects of the invention are accomplished by contacting a solution of the polymer in a paraffinic hydrocarbon solvent with crystalline metallic alumino-silicates which have been heated to remove the water of hydration and which have uniform pore diameters of 13–14 angstroms. These alumino-silicates selectively adsorb aromatic compounds from mixtures of aromatic and paraffinic compounds and adsorb only those molecules small enough to enter the pore system. Consequently, when a hydrocarbon polymer is dissolved in an aliphatic hydrocarbon solvent, such as normal heptane, and contacted with an alumino-silicate, the polymer molecule will be too large to enter the pores of the adsorbent and hence will not be affected. Any aromatic, cyclo olefinic or diolefinic hydrocarbons, on the other hand, will be selectively adsorbed and thus removed from the solution of the polymer. Upon recovering the polymer from the solvent, an uncontaminated product is obtained.

The invention will be more clearly understood by the following examples which are presented as illustrative only and not as limiting the invention thereto.

*Example 1*

A mixture of 40% isobutylene and 60% styrene was polymerized at a temperature of —10° C. in the presence of aluminum chloride dissolved in methyl chloride and in a sufficient amount of normal heptane to give a solution of 15% polymer in heptane. This material was stripped and the refractive index of the overhead was determined.

To a portion of the above solution was added 2.3 wt.

percent monomeric styrene and divided into two portions. One portion was stripped and the refractive index of the overhead was determined. The other portion was percolated through a sodium alumino-silicate having uniform pore size of 13 A. and which has been heated to remove the water of hydration. The effluent was stripped and the refractive index of the overhead determined. The following data were obtained:

| Sample | Description | Treatment | R.I. @ 25° C. |
|---|---|---|---|
| 1 | n-heptane | None | 1.4012 |
| 2 | n-heptane+15% polymer | None | 1.4013 |
| 3 | n-heptane+15% polymer+2.5% styrene | None | 1.4038 |
| 4 | n-heptane+15% polymer+2.5% styrene | Absorbent | 1.4000 |

A similar, but higher molecular weight polymer produced at −100° C. can be treated in the same manner.

The above data show that styrene can be substantially completely removed from a hydrocarbon solution of polymer and styrene as indicated by the lowered refractive index of the treated sample as compared with the untreated samples. A portion of the impurities present in the heptane were also removed.

*Example II*

A mixture of 95% normal heptane and 5% styrene was prepared and the refractive index of the styrene-free heptane and of the mixture was determined. The mixture was then contacted for 10 minutes in a column with a crystalline alumino-silicate from which the water of crystallization had been removed and which had a pore size of 13–14 angstrom. The following results were obtained:

| Sample | Description | Treatment | R.I. |
|---|---|---|---|
| 1 | n-heptane | None | 1.4010 |
| 2 | n-heptane+5% styrene | None | 1.4071 |
| 3 | n-heptane+5% styrene | Alumino-silicate | 1.4010 |
| 4 | n-heptane+10% styrene | None | 1.4155 |
| 5 | n-heptane+10% styrene | Alumino-silicate | 1.4019 |

The above data clearly show that styrene can be substantially completely removed from mixtures with aliphatic hydrocarbons when present in small proportions of 5% or less and can be almost completely removed at higher concentrations.

*Example III*

A gas oil petroleum fraction derived from a paraffinic type crude was subjected to cracking at a temperature of about 1200° to 1300° F. A hydrocarbon stream which, according to analysis, consisted approximately of 14% dienes, 43% olefins, and 43% aromatics and saturated hydrocarbons and boiling between 30° and 130° C., prepared by steam cracking of a gas oil, was polymerized in the presence of aluminum chloride at a temperature of 20° C. A hydrocarbon resin was obtained in 25% yield having a softening point of 85° C. (ASTM-E-28-51T) and a color of 9 as determined on the Gardner colorimeter. The resin was recovered by stripping off the unreacted hydrocarbons by vacuum distillation to a pot temperature of 250°–270° C. at 2–5 mm. Hg. Analysis indicated that this resin was substantially of a non-aromatic unsaturated structure, little or none of the aromatic constituents of the feed having entered the composition.

By dissolving the resulting resin in normal heptane and percolating through a dehydrated sodium alumino-silicate of 13–14 A. as described in Example I, a water-white resin free from toxic and other contaminating hydrocarbon impurities can be obtained.

*Example IV*

A butadiene-isobutylene-toluene feed containing a 60-20-20 ratio of monomers was diluted with methyl chloride and treated with AlCl₃-ethyl chloride catalyst under reflux. A yield of 64% of soft product, based on total feed, was obtained at a catalyst efficiency of 74 g./g. When this resin is dissolved in a paraffinic hydrocarbon solvent and passed through a sodium alumino-silicate of 13–14 A. as described in Example I a resin completely free from toluene is obtained.

*Example V*

A copolymerization feed was formulated from 95% by weight of isobutylene, 3% of styrene and 2% of 1,3-butadiene. About 3 volumes of liquid ethane were added, to serve both as internal refrigerant and as diluent. When the mixture was cold, about −90° C., BF₃ gas was added as catalyst. A copolymer of molecular weight of about 18,000 was obtained. It had an iodine number of about 1. A styrene-free polymer is easily obtained by percolating this resin in paraffinic hydrocarbon solution through 13–14 A. alumino-silicate in accordance with the procedure of Example I.

*Example VI*

A series of polymerizations were carried out in which isobutylene was copolymerized with isoprene by cooling the mixture by a liquid ethylene cooling jacket to approximately −102° C. (the temperature tending to range between −95° C. and −102° C.), and using three volumes of methyl chloride as diluent, and using as catalyst approximately 150 parts, based on 100 parts of reactants, of a 0.23 weight percent solution of aluminum chloride in methyl chloride, as catalyst. The polymerization reaction mixture contained about 5% isoprene based on the amount of isobutylene used. In each run, varying amounts (0.1 to 1.5%) of divinyl benzene were employed. Any entrained vinyl benzene remaining in the polymer is easily removed by contacting it with the alumino-silicates in accordance with the teachings of Example I.

*Example VII*

Ethylene gas was passed through liquid styrene at room temperature. The mixture of ethylene gas and styrene vapor was passed into a mixture of equal weight proportions of ethyl chloride and methyl chloride containing 2.3 g. AlCl₃ per 100 mol. of solution. The mixed catalyst was held at a temperature of −25° C. under reflux during the process, which continued for 3 hours. The polymer oil product was removed from the catalyst by washing with alcohol and with water. The dried copolymer oil showed a viscosity at 100° F. of 107.4 centistokes or 496.2 seconds Saybolt at 100° F. After passing a paraffinic hydrocarbon solution of this copolymer through an alumino-silicate of 13–14 A. according to Example I, a styrene-free resin can easily be obtained.

*Example VIII*

Several runs were carried out in a 3-gallon turbomixer type of reactor according to the following recipe:

Styrene _____ 75 parts.
Isoprene _____ 25 parts.
Lorol mercaptan¹ _____ 0.05 part at start.
Lorol mercaptan¹ _____ 0.05 part at 75% conv.
Water _____ 300 parts.
Sodium soap of selectively hydrogenated tallow acids (complete neutralization) ____ 7 parts.
Potassium persulfate _____ 0.45 part.
Temperature _____ 50° C. at start.
　Raised after 50% conversion to _____ 55° C.
　Raised after 75% conversion to _____ 60° C.
Conversion _____ 93±2%.
Time _____ 14–16 hours.

¹ Lorol mercaptan is predominately C₁₂ mercaptan obtained from commercial lauryl alcohol.

The latices formed were short-stopped at the end of the reaction with hydroxylamine or hydroquinone, and stabilized with 0.5–1.0% of a suitable anti-oxidant such as phenyl beta naphthylamine.

The latex was coagulated by adding the same to about an equal volume of saturated sodium chloride brine, below 50° C., whereupon the mixture was brought to 50° C. and 0.2 N acetic acid added to get the desired particle size and then quenched with 0.2 N NaOH. The slurry was then diluted with an equal volume of cool water and filtered, cake reslurried twice with water at 40° C. and then in alkali followed by final water washing and drying. The dried polymer, after dissolving in a paraffinic solvent, can be treated in accordance with the teachings of Example I and a monomeric styrene-free polymer obtained.

*Example IX*

30 grams of isoprene and 90 grams of styrene were emulsified in 45 parts of water, having dissolved therein 5 parts of a 2.8 solution of potassium persulfate and approximately 1.2 parts of sodium oleate. To this mixture there was added 30 cc. of carbon disulfide. The emulsion of these various materials was maintained in a pressure vessel by rapid stirring over a time interval of 16 hours, and the temperature was held at 35° C. At the end of this time interval, a latex-like emulsion was obtained. This emulsion was coagulated by the addition of approximately an equal volume of saturated brine. The resulting coagulum amounted to 81% of the original unsaturates. The coagulum was washed with water and dried by milling on a warm roll mill to yield an elastic, somewhat plastic material. By dissolving the polymer in a paraffinic solvent and percolating it through an aluminosilicate of 13–14 A. as described in Example I, a monomeric styrene-free polymer can be obtained.

While the above examples describe the purification of specific polymers, it is obvious that the process is just as easily applicable to any copolymer of isobutylene and styrene having a molecular weight between 1500 and 50,000 and prepared in accordance with the process of U.S. Patent 2,274,749, issued March 3, 1942, and to hydrocarbon resins prepared by Friedel-Crafts polymerization of steam-cracked gas oil fractions boiling 20°–280° C. or of any intermediate fraction, according to the teachings of U.S. Patent 2,734,046, issued February 7, 1956 (the subject matter of each of these patents being incorporated herein by reference), or to any other polymer containing aromatic hydrocarbons as impurities.

Furthermore, the process is applicable to the separation of contaminating amounts of aromatic hydrocarbons, cyclo diolefin hydrocarbons and diolefin hydrocarbons from any hydrocarbon polymerization reaction product containing any of these impurities, provided the polymer is soluble in a paraffinic hydrocarbon solvent.

The present application is a continuation-in-part of Serial No. 471,883, filed November 29, 1954, and now abandoned.

The nature of the present invention having been thus fully set forth and specific examples of the same given, what is claimed as new and useful and desired to be secured by Letters Patent is:

1. A process for separating unreacted aromatic hydrocarbon monomers from a hydrocarbon polymerization reaction product which comprises dissolving at least a portion of said reaction product comprising unreacted aromatic monomer in a paraffinic solvent and contacting said solution with a crystalline metallic alumino-silicate which has been heated to remove water of hydration, and which has a uniform pore size of 13–14 angstroms.

2. In a process for polymerizing a mixture of isobutylene and styrene by contact with an active halide catalyst at a temperature below 0° C. whereby a thermoplastic polymer having a molecular weight between about 1500 and 50,000 is obtained which contains a small amount of monomeric styrene dissolved therein, the method of removing said monomeric styrene which comprises dissolving said polymer in a paraffinic hydrocarbon solvent and contacting said solution with a crystalline metallic alumino-silicate which has been heated to remove the water of hydration and which has a uniform pore size of 13–14 angstroms.

3. In a process for polymerizing a steam-cracked hydrocarbon fraction boiling between 20° and 280° C. with a Friedel-Crafts catalyst at temperatures between —100° C. and +100° C. whereby a thermoplastic polymer having a softening point of 85° to 100° C. is obtained which contains a small amount of aromatic hydrocarbons dissolved therein, the method of removing said monomeric styrene which comprises dissolving said polymer in a paraffinic hydrocarbon solvent and contacting said solution with a crystalline metallic alumino-silicate which has been heated to remove the water of hydration and which has a uniform pore size of 13–14 angstroms.

4. In a process for polymerizing a mixture of butadiene, isobutylene and toluene by contact with a Friedel-Crafts type catalyst dissolved in a low-freezing, non-complex forming catalyst at a temperature between 0° C. and —150° C. whereby a polymer is obtained which contains a small amount of monomeric toluene dissolved therein, the method of removing said monomeric toluene which comprises dissolving said polymer in a paraffinic hydrocarbon solvent and contacting said solution with a crystalline metallic alumino-silicate which has been heated to remove the water of hydration and which has a uniform pore size of 13–14 angstroms.

5. In a process for polymerizing a mixture of isobutylene, styrene and butadiene by contact with boron fluoride at a temperature between 0° C. and —150° C. whereby a polymer is obtained which contains a small amount of monomeric styrene dissolved therein, the method of removing said monomeric styrene which conprises dissolving said polymer in a paraffinic hydrocarbon solvent and contacting said solution with a crystalline metallic alumino-silicate which has been heated to remove the water of hydration and which has a uniform pore size of 13–14 angstroms.

6. In a process for polymerizing a mixture of isobutylene, isoprene and 0.5 to 1.5% divinyl benzene whereby a polymer is obtained which contains a small amount of monomeric divinyl benzene dissolved therein, the method of removing said monomeric divinyl benzene which comprises dissolving said polymer in a paraffinic hydrocarbon solvent and contacting said solution with a crystalline metallic alumino-silicate which has been heated to remove the water of hydration and which has a uniform pore size of 13–14 angstroms.

7. In a process of polymerizing a mixture of ethylene and styrene by contact with a Friedel-Crafts catalyst dissolved in a non-complex forming low-freezing solvent at a temperature between —80° and +60° C. whereby a polymer is obtained which contains a small amount of monomeric styrene dissolved therein, the method of removing said monomeric styrene which comprises dissolving said polymer in a paraffinic hydrocarbon solvent and contacting said solution with a crystalline metallic alumino-silicate which has been heated to remove the water of hydration and which has a uniform pore size of 13–14 angstroms.

8. In a process for polymerizing a mixture of isoprene and styrene by emulsifying in water in the presence of an oxygen-providing polymerization catalyst and an emulsifier at a temperature between 25° and 75° C. whereby a polymer is obtained which contains a small amount of monomeric styrene dissolved therein, the method of removing said monomeric styrene which comprises dissolving said polymer in a paraffinic hydrocarbon solvent and contacting said solution with a crystalline metallic alumino-silicate which has been heated to remove the water of hydration and which has a uniform pore size of 13–14 angstroms.

References Cited in the file of this patent

UNITED STATES PATENTS

| | | |
|---|---|---|
| 1,728,732 | Jaeger | Sept. 17, 1929 |
| 2,818,449 | Christensen et al. | Dec. 31, 1957 |
| 2,882,244 | Milton | Apr. 14, 1959 |

OTHER REFERENCES

Barrer et al.: "Separation of Mixtures Using Zeolites as Molecular Sieves. Part II, J. Soc. Chem. Ind. (London), vol. 64 (May 1945), pages 131–133 (page 133 only needed).